Nov. 23, 1926.    1,607,787
J. G. WINSOR ET AL
SEMITRAILER
Filed June 16, 1924    4 Sheets-Sheet 1
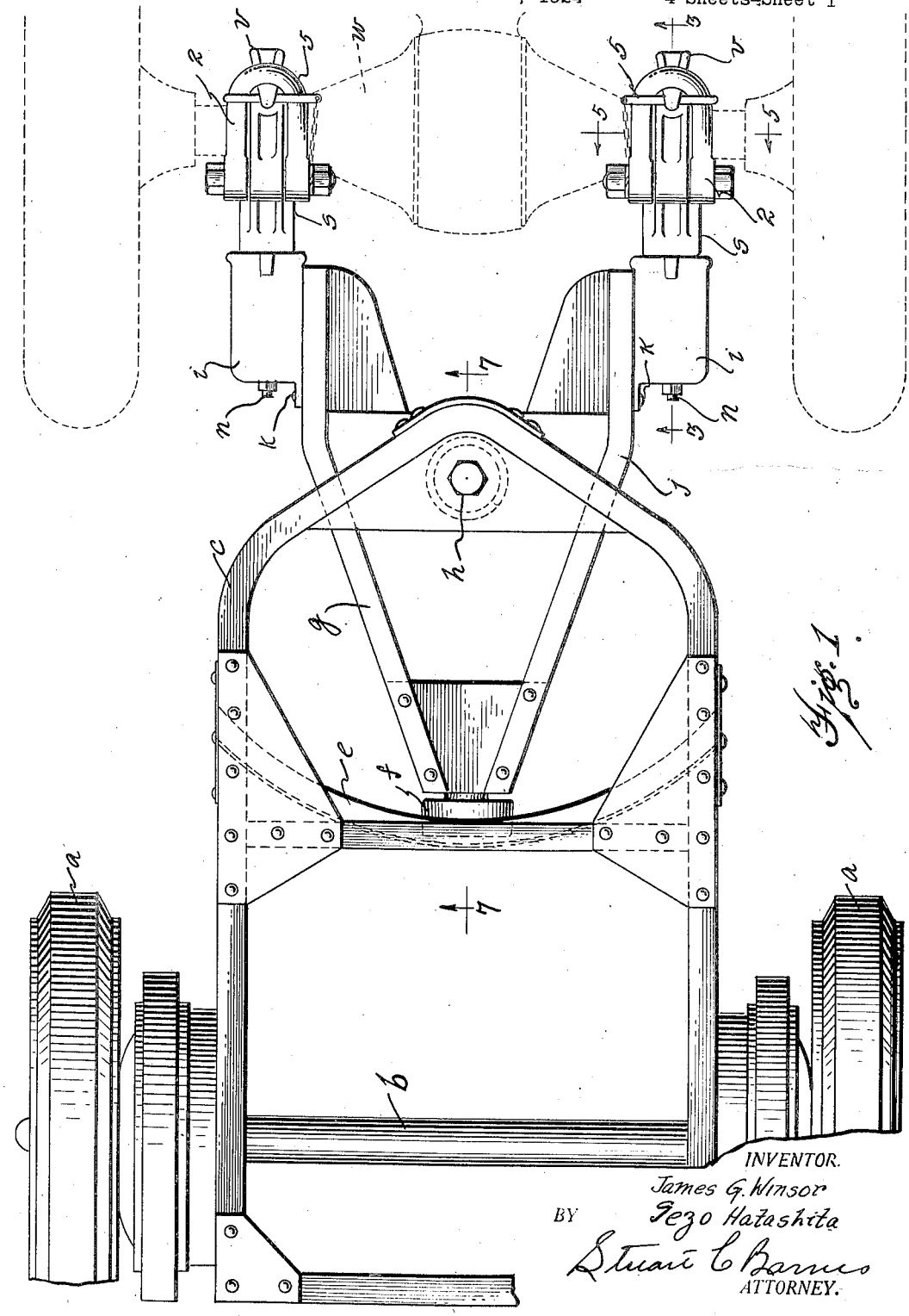
INVENTOR.
James G. Winsor
Gezo Hatashita
BY
Stuart C. Barnes
ATTORNEY.

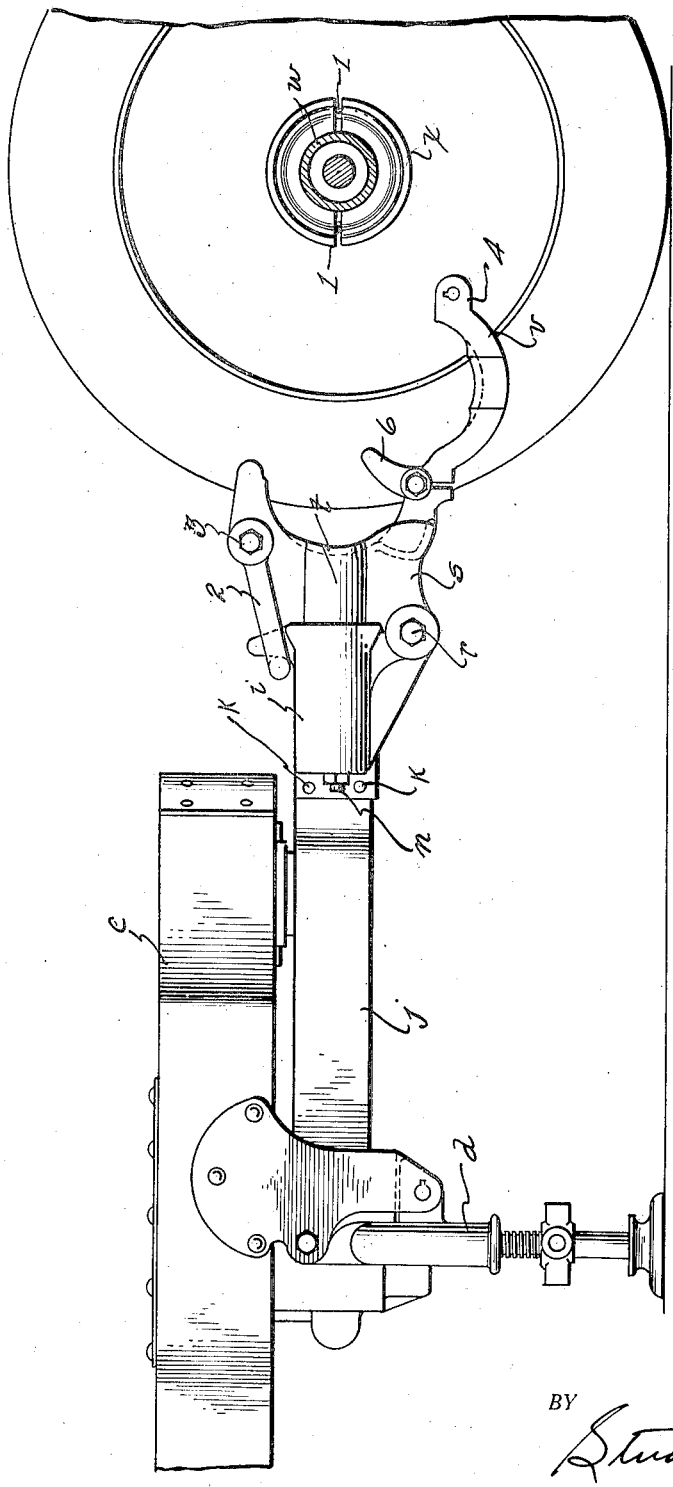

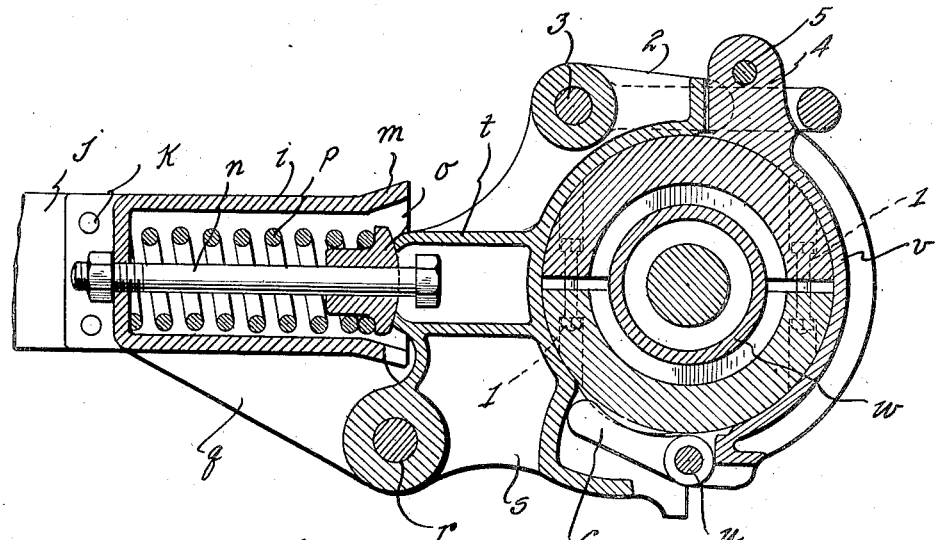
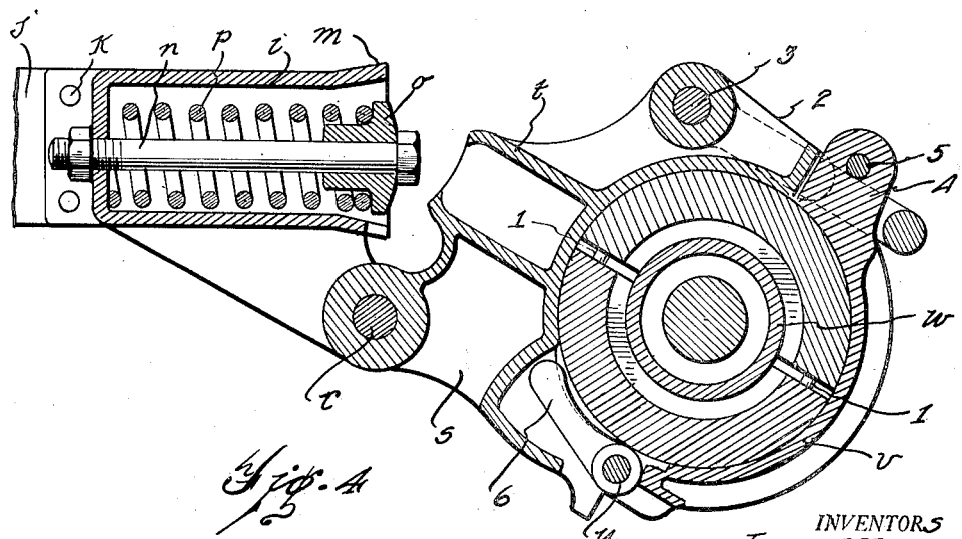

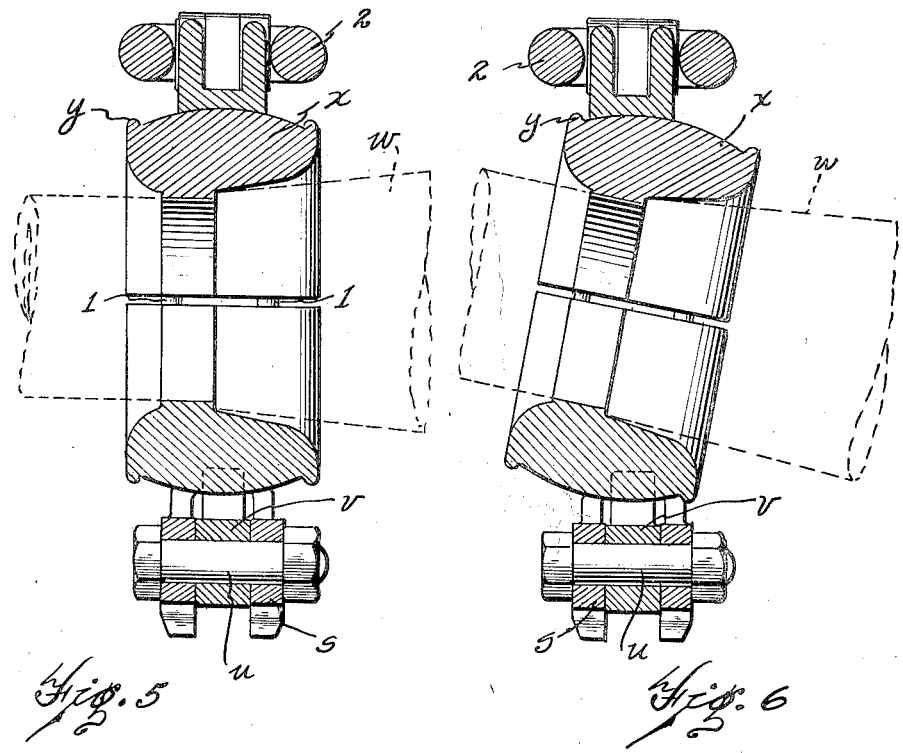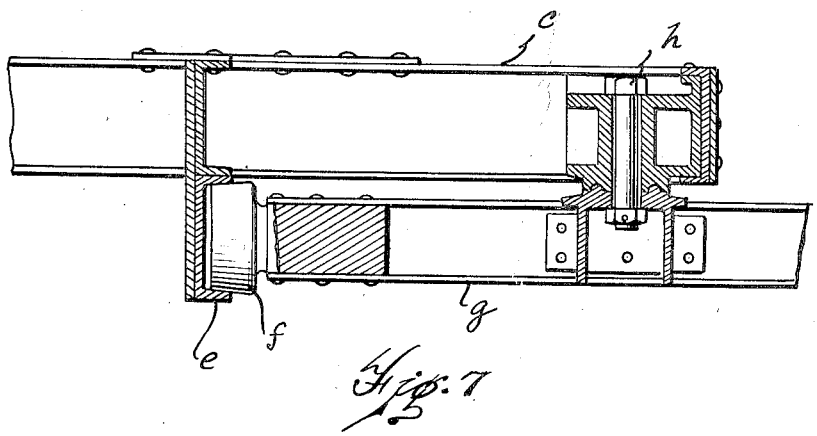

Patented Nov. 23, 1926.

1,607,787

UNITED STATES PATENT OFFICE.

JAMES G. WINSOR AND SEZO HATASHITA, OF ANN ARBOR, MICHIGAN.

SEMITRAILER.

Application filed June 16, 1924. Serial No. 720,226.

This invention relates to semi-trailers, and especially to a semi-trailer that is intended to be used with a tractor, and is a continuation in part of our prior co-pending application Serial No. 535,163, February 9, 1922.

The object of the invention is to provide a trailer in which the ordinary pole is done away with, and the pivot point of the connection between the trailer and the towing unit is brought back to the chassis frame of the main trailer. This results in the semi-trailer having a smaller radius to swing on, the pivot being between the rear wheels of the tractor and the wheels of the semi-trailer. This novel arrangement of pivotally connecting the trailer with the towing unit is accomplished by means of a segment of a large fifth wheel. The upper fifth wheel part is carried by the trailer frame and the lower fifth wheel part comprises a swivelling frame member which we style a tail frame.

Another feature of the invention is the means for pivotally hitching the tail frame to the axle of the towing unit, and to provide means whereby this hitch may be swivelly connected to the axle.

In the drawings:

Fig. 1 is a plan view of the semi-trailer showing the rear portion of the towing unit in dotted lines.

Fig. 2 is a side elevation of the trailer showing the towing unit just before the same is backed in to the trailer to be connected therewith.

Fig. 3 is a vertical section through the cushioning member and hitch taken substantially on the line 3—3 of Fig. 1.

Fig. 4 is a view similar to Fig. 3, but showing the axle of the towing unit lowered.

Fig. 5 is a section through the hitch taken on the line 5—5 of Fig. 1.

Fig. 6 is a similar sectional view showing the axle of the towing unit, inclined to the horizontal.

Fig. 7 is a section on the line 7—7 of Fig. 1 showing the swivelly fifth wheel connection between the tail frame and the trailer frame.

The wheels of the trailer are designated $a$ and are mounted on the axle $b$ supported by the trailer frame. $c$ designates the chassis frame for the trailer. The wheels and axle are supported on the trailer frame by a suitable spring suspension which is not necessary to describe here as this forms no part of the invention. A leg $d$ is adapted to be dropped for supporting the front end of the trailer when the same is unhitched from the towing unit.

Secured to the underside of the trailer frame is a segmental channel guide $e$ which forms a runway or guide for the roller $f$, carried at the end of the triangular frame $g$. This triangular frame is pivoted to the chassis frame of the trailer as at $h$ so as to allow the same to swivel on a vertical axis. This triangular frame is what we term the tail frame and forms the lower part of the fifth wheel connection, while the segmental channel forms the upper part of the fifth wheel connection. This tail frame need not be triangular in shape in order to function on the same principle, and hence we will hereinafter designate the same as a tail frame, which covers a frame structure of any shape which may be swivelled to the chassis frame and carry a roller at a point remote from the pivot which will provide a large fifth wheel segment.

A pair of fixtures $i$ are bolted to the side sills $j$ of the tail frame as at $k$. These fixtures are hollow and opened at one end, the open end of said fixture being flared as at $m$. A bolt $n$ is adjustably secured to the fixture and extends longitudinally of the fixture and the bumper $o$ is slidably supported on the bolt, and prevented from sliding off by the bolt head. A heavy coil spring $p$ is interposed between this bumper and the bottom of the fixture thereby yieldingly forcing the bumper outwardly. A depending ear $q$ is carried by the fixture and pivotally secured thereto as at $r$ is a yoke $s$. This yoke is a casting and formed integrally therewith is the hollow stud projection $t$, which as shown in Fig. 3 engages against the bumper $o$. Pivotally secured to the yoke as at $u$ is a clamping member or hinge arm $v$. This clamping member and yoke are recessed so as to engage the axle of the towing unit in a manner hereinafter to be described.

Secured to the axle housing $w$ of the towing unit is a two-part clamp which we term an adapter ring $x$. The outer periphery of this adapter ring is convex in cross section as shown in Figs. 5 and 6, and is provided with the flanges y at the sides, thereby forming a channel. This two-part adapter ring is bolted to the axle housing as at 1. The yoke and clamping member, s and v respectively, engage about this two-part adapter ring and when fitted therearound may be locked in place by means of the clevis or locking loop 2 which is pivoted to the yoke part of the clamp as at 3 and is engaged over the projection 4 carried by the clamping member v. A pin 5 may be then thrust into this projection to prevent the clevis from unlocking.

Carried by the yoke clamp v is a finger 6 which, as shown in Fig. 2, when the clamp is dropped is directly in the path of the axle of the towing unit when the same is being backed into the trailer. The axle then engages the finger, thereby causing the clamp to close about the axle, whereupon the clevis may be dropped over the clamp for securing the same in such locked position. The yoke s and clamping member v may be termed a hitch as they are utilized for hitching the tail frame to the axle of the towing unit.

The function of the cushioning spring is quite evident. An upward force exerted on the axle of the towing unit when the towing unit rides over a bump, tends to force the projection t against the bumper o thereby compressing the spring. This spring is designated to resist a load of approximately 6000-lbs. and thus is sufficiently strong so as to prevent the projection t from bumping the side walls of the fixture. As shown in Fig. 3, the fixture is flared as at m so as to allow plenty of clearance for the projection t of the hitch. When the axle falls the projection t merely disengages from the bumper as shown in Fig. 4.

One of the important features of this hitch is, that the axle of the towing unit may be inclined with respect to the horizontal, caused by one of the wheels of the towing unit riding over a bump, which raises one end of the axle without tipping the trailer. The end of the axle carries an adapter ring, as shown in Fig. 6, and the hitch secured about said adapter ring has a swivelling connection therewith, sideways as well as circumferentially (ball and socket). This will cause the spring p in the fixture to resist the closing of the hitch and tail frame about the pivot c, the load being transferred from the trailer through this connection. As the tail frame and trailer frame are connected together in such a way that they have a swivelling connection only on a vertical axis, the raising of one side of the tail frame will raise the entire trailer frame and maintain the same in a horizontal position. Since one end of the axle is lower, the hitch must move relatively with respect to the tail frame and falls away as shown in Fig. 4. This means that the entire load is carried through the fixture and hitch at the high end of the axle.

One of the features of this pivotal connection between the tail frame and the towing unit is that the dead load is carried downwardly through the fixture to the pivot r thence up diagonally through the axle of the towing unit and then backwardly and horizontally against the cushioning spring p. When the trailer tends to over-ride the towing unit, the strain is taken up directly by the cushioning member. As seen by observing Fig. 3, a pull exerted by the towing unit in pulling the trailer is transmitted through the pivot r. The connection is so designed that the draw bar pull can never exceed the thrust on the springs p caused by the load, which will thus prevent the projection t, carried by the hitch, from disengaging from the bumper o. The draw bar pull, of course, tends to straighten out the trailer, the pivot r and the axle, tending to disengage the hitch from the bumper o, whereas the dead load tends to press downwardly on the pivot r to close the gap and maintain the projection t of the hitch in contact with the bumper o.

What we claim is:

1. The combination of a towing unit, a trailer provided with a chassis frame having a guide, a tail-frame secured to the towing unit and projecting rearwardly therefrom and having pivotal connection with the chassis frame of the trailer, the rear of the tail-frame being supported and guided in the said guide to swing through an arc, and hitch connections for securing the tail-frame to the towing unit including a member mounted on the frame and a member movably mounted on the towing unit, these two members being connected together in such a way so that they are movable relative to each other, the said movable connections permitting the towing unit to tilt laterally without similarly tilting the tail-frame.

2. The combination of a towing unit, a pair of hitches that may be removably secured to the axle of the towing unit, a tail frame provided with a pair of fixtures provided with cushioning springs and which are hinged to the hitches, said springs interposed between the tail frame and hitches to absorb the thrust of the hitch due to its movement about its hinge with respect to the tail frame, and a trailer provided with a chassis frame having a pivotal connection under the chassis frame with the tail frame.

3. The combination of a towing unit, a pair of hitches that may be removably secured to the axle of the towing unit so as to pivot thereabout, a tail frame provided with a pair of fixtures adapted to have a hinging action with respect to the hitches on the axle and provided with buffer springs for buffing the movement of the tail frame with respect to the hitches, a trailer provided with a chassis frame and a horizontal swivelling connection between the chassis frame and the tail frame.

4. The combination of a towing unit, a tail frame secured to the rear of the towing unit and projecting rearwardly therefrom, the said tail frame in the form of a triangular frame, a trailer provided with a chassis frame, and a swivelling connection between the chssis frame at an intermediate point on the triangular tail frame, the said chassis frame provided with a segmental guide channel and adapted to take the apex of the triangular frame and act as a guide for the same, and hitch connections for securing the tail-frame to the towing unit including a member mounted on the frame, and a member movably mounted on the towing unit, these two members being connected together in such a way that they are movable relative to each other, the said movable connections permitting the towing unit to tilt laterally without similarly tilting the tail-frame.

5. The combination of a towing unit, a two part channelled adapter bushing that may be permanently clamped on to the axle of the towing unit, a hitch removably secured within said channel and having a limited sidewise rocking movement with respect to the bushing, and a tail frame having a hinge connection with the hitch on a horizontal axis.

6. The combination of a towing unit, a hitch that may be removably clamped onto a member of the towing unit and which is provided with a rearwardly projecting stud portion, a tail frame, a fixture thereon containing a spring adapted to engage the stud projection of the clamp to act as a buffer, and a hinge connection between the tail frame fixture and the hitch.

7. The combination of a towing unit, a two-part channelled ring member that may be permanently clamped onto a member of the towing unit, a hitch having a hinge arm together with a locking loop which may be engaged over the end of the hinge arm to removably clamp the arm onto the channelled ring, and a tail frame provided with a fixture at its forward end adapted to have a hinging relation with the hitch secured to the towing unit.

8. The combination of a towing unit provided with an axle and axle housing, a pair of hitches detachably secured to the axle housing and locked by a loop, and a tail frame having a pair of diverging arms, each arm having a housing secured thereto and hinged on to one of the hitches containing a spring element, said spring element disposed between the tail frame and the hitch above the hinging portion to act as a buffer.

9. The combination of a towing unit, a hitch secured to the axle thereof to turn thereabout, a trailer having a frame on which the trailer is pivoted to turn on a vertical axis, said frame secured at its forward end to said hitch to have a limited movement with respect thereto.

10. The combination of a towing unit, a hitch secured to the axle thereof to turn thereabout, a trailer, a frame on which the trailer is pivoted to turn on a vertical axis, said frame secured at its forward end to said hitch to have a limited movement with respect thereto on a horizontal axis and a spring for cushioning such limited movement.

11. The combination with a towing unit provided with an axle, an adaptor bushing having a convex surface permanently clamped to the axle and a hitch having a concave inner surface secured around the adaptor bushing to turn thereabout.

12. The combination of a towing unit provided with an axle, an adaptor bushing, having a concave surface clamped to the axle and a hitch having a concave inner surface rmovably secured to the adaptor bushing to turn thereabout.

13. The combination of a towing unit provided with an axle and a channelled adaptor bushing clamped thereto, and a hitch having a thickness less than the width of the channel secured within the channel of the bushing to turn about the axle.

14. The combination of a towing unit, a two wheel trailer chassis frame and a lower fifth wheel frame (the tail frame) supported on said trailer and having a relatively long reach backward from the vertical axis of revolution towards the center of the trailer said backward reach having its rear end secured to the trailer to prevent vertical separation but allow swinging on a vertical axis and said frame having a relatively long reach forward beyond the front end of the trailer to act as a trailer pole, and hitch connections for connecting the forward end of the trailer to the towing unit and including universal joints.

15. The combination of a towing unit of a semi-trailer provided with two wheels and having a relatively long under fifth wheel frame (the tail frame) on which the trailer can swivel on a vertical axis, said frame being secured to the trailer so as to prevent rocking on a horizontal axis, and a hitch secured slidably around the axle of the towing unit and to which the forward end of said frame is hingedly connected.

16. The combination with a towing unit, a hitch universally secured to the towing unit and arranged to break on a horizontal axis, a semi-trailer provided with two wheels and having a lower fifth wheel frame tied thereto so as not to rock on a horizontal axis but to turn on a vertical axis, the forward end of the fifth wheel frame being extended and connected with the said hitch.

17. The combination with a towing unit provided with an axle, an adaptor bushing permanently clamped to the axle, and a hitch secured around the adaptor bushing and having a ball and socket connection therewith.

18. The combination of a towing unit provided with an axle, an adaptor bushing clamped to the axle, and a hitch removably secured around the adaptor bushing and having a ball and socket connection therewith.

19. The combination of a towing unit provided with an axle and channelled adaptor bushing clamped thereto, and a hitch secured around the bushing within the channel thereof and having a ball and socket connection therewith.

20. The combination of a towing unit provided with an axle, a trailer, a tail frame carried by the towing unit which has a swivelling connection with the trailer on a vertical axis, and means for connecting the tail frame to each end of the axle which permits the tilting of the axle within given limits without tilting the trailer and tail frame carried thereby, the said connecting means including a member mounted on the frame, and a member mounted on the towing unit, these members being movable relative to each other on a horizontal axis and both of said members being movable relative to the towing unit on a horizontal axis extending at right angles to the first mentioned axis.

21. The combination of a towing unit provided with an axle, a trailer, a tail frame carried thereby and having a swivelling connection therewith on a vertical axis, a pair of hitches hinged to said tail frame, and means for supporting each hitch on one end of the axle, thereby permitting the tilting of the axle within given limits without tilting the trailer and tail frame carried thereby.

22. The combination of a towing unit provided with an axle, a trailer, a tail frame carried thereby having a swivelling connection therewith on a vertical axis, a pair of hitches hinged to said tail frame, provided with ball and socket connections for securing each hitch to one end of the axle, thereby permitting the tilting of the axle within given limits without tilting the trailer and tail frame carried thereby.

23. The combination of a towing unit provided with an axle, a trailer, a tail frame carried thereby and having a swivelling connection therewith on a vertical axis, hitches hinged to said tail frame, means for supporting each hitch on one end of each axle, thereby permitting the tilting of the axle within given limits without tilting the trailer and tail frame carried thereby, and means for cushioning the hinged connection between the tail frame and hitch.

24. The combination of a towing unit provided with an axle, adaptor rings clamped about the said axle one at each end thereof, a trailer, a tail frame carried thereby and having a swivelling connection therewith on a vertical axis, and hitches hinged to said tail frame and provided with ball and socket connections for securing the hitches to the adaptor rings to secure each hitch to the axle, thereby permitting the tilting of the axle within given limits without tilting the trailer and tail frame carried thereby.

In testimony whereof we have affixed our signatures.

JAMES G. WINSOR.
SEZO HATASHITA.